US012393155B2

(12) United States Patent
Ashikagaya et al.

(10) Patent No.: US 12,393,155 B2
(45) Date of Patent: Aug. 19, 2025

(54) INTERNAL COVER AND IMAGE FORMING APPARATUS

(71) Applicants: Atsushi Ashikagaya, Kanagawa (JP); Hironori Ohshima, Kanagawa (JP); Yoshihiko Satoh, Kanagawa (JP)

(72) Inventors: Atsushi Ashikagaya, Kanagawa (JP); Hironori Ohshima, Kanagawa (JP); Yoshihiko Satoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/632,873

(22) Filed: Apr. 11, 2024

(65) Prior Publication Data

US 2024/0353788 A1 Oct. 24, 2024

(30) Foreign Application Priority Data

Apr. 18, 2023 (JP) ................................ 2023-067660

(51) Int. Cl.
*G03G 21/16* (2006.01)
*G03G 15/00* (2006.01)

(52) U.S. Cl.
CPC ..... *G03G 21/1633* (2013.01); *G03G 21/1647* (2013.01)

(58) Field of Classification Search
CPC ............... G03G 21/16; G03G 21/1633; G03G 21/1647; G03G 2221/16
See application file for complete search history.

(56) References Cited

U.S. PATENT DOCUMENTS 6,796,736 B1 * 9/2004 Shiraishi ............ G03G 21/1638 400/692

FOREIGN PATENT DOCUMENTS

JP H08-016064 A 1/1996
JP 2002-318480 A 10/2002

* cited by examiner

*Primary Examiner* — Sophia S Chen
(74) *Attorney, Agent, or Firm* — Harness, Dickey & Pierce, P.L.C.

(57) ABSTRACT

An internal cover that covers a unit inside an image forming apparatus is provided. The internal cover includes: a cover portion openable and closable by rotation on a rotation shaft; a hinge portion that forms the rotation shaft of the cover portion, where the rotation shaft is inclined with respect to a vertical direction of the image forming apparatus to allow the cover portion to be opened diagonally upward; and a hand-cranked fixing screw that maintains the cover portion in a closed state. The cover portion is opened diagonally upward as the hand-cranked fixing screw is released, and the cover portion is fixable in an opened state at a predetermined position.

6 Claims, 4 Drawing Sheets

INTERNAL COVER AND IMAGE FORMING APPARATUS

CROSS-REFERENCE TO RELATED APPLICATIONS

This patent application is based on and claims priority pursuant to 35 U.S.C. § 119 (a) to Japanese Patent Application No. 2023-067660, filed on Apr. 18, 2023, in the Japan Patent Office, the entire disclosure of which is hereby incorporated by reference herein.

BACKGROUND

Technical Field

The present disclosure relates to an internal cover and an image forming apparatus.

Related Art

It is known that an electrophotographic image forming apparatus is subject to maintenance of a unit inside the apparatus in order to maintain performance such as image quality and conveyance quality. Examples of the maintenance include replacement of the unit. To make the unit to be replaceable, it is desirable to make the replacement work easier, set the replaced unit correctly, and the like.

In conventional technologies, an internal cover for covering a unit to be maintained is screwed on, and an operator has to remove the internal cover using a tool such as a screwdriver to access and replace the unit. This not only increases the labor required for the replacement work but also causes more time for the replacement work. This applies not only to the unit replacement, but also to maintenance work including unit inspection, repair, modification, and the like.

Further, until now, a service provider visits to the location where the apparatus was installed and performs the maintenance such as the unit replacement. However, recently, to reduce service costs and minimize downtime, there has been a demand for allowing a user to perform the replacement work.

SUMMARY

According to embodiments of the present invention, an internal cover that covers a unit inside an image forming apparatus is provided. The internal cover includes: a cover portion openable and closable by rotation on a rotation shaft; a hinge portion that forms the rotation shaft of the cover portion, where the rotation shaft is inclined with respect to a vertical direction of the image forming apparatus to allow the cover portion to be opened diagonally upward; and a hand-cranked fixing screw that maintains the cover portion in a closed state. The cover portion is opened diagonally upward as the hand-cranked fixing screw is released, and the cover portion is fixable in an opened state at a predetermined position.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 6A is a state in which an internal cover is closed, FIG. 6B is a state in which the internal cover is being opened, and FIG. 6C is a state in which the internal cover is opened and fixed at a predetermined position.

Figure 1:
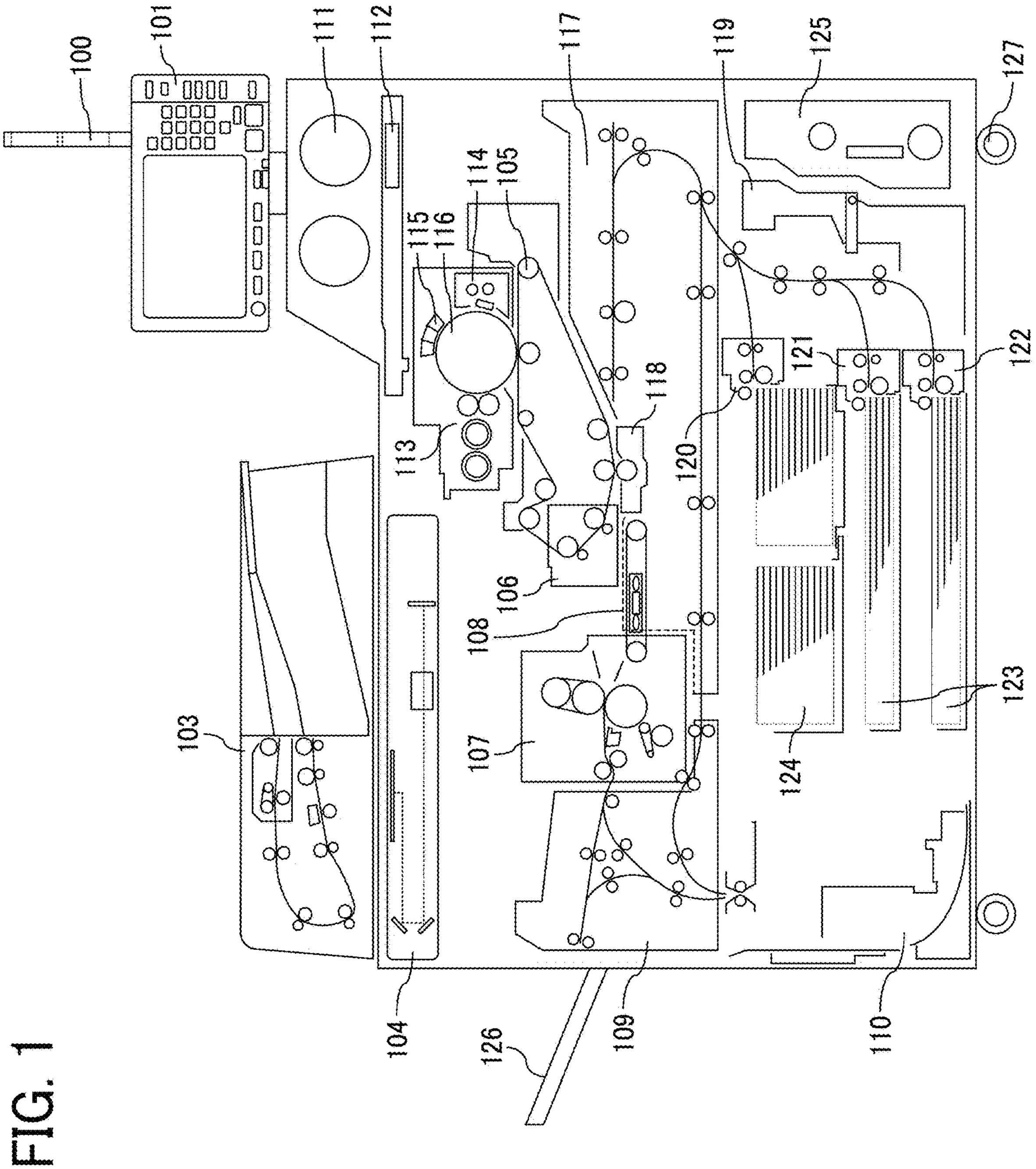
FIG. 1 is an overall schematic diagram of an image forming apparatus.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

According to embodiments of the present invention, an internal cover that covers a unit inside an image forming apparatus is provided that allows easy access to a unit to be maintained, facilitates maintenance work such as unit replacement, and hardly obstructs replacement of other units.

Hereinafter, an internal cover and an image forming apparatus according to embodiments of the present invention are described with reference to the drawings. It should be noted that the present invention is not limited to the embodiments described below. The present invention can be modified by another embodiment, addition, alteration, deletion, or the like within a range conceivable by a person skilled in the art. Any aspect of modification is included in the scope of the present invention as far as the modification can exhibit the effects and advantages of the present invention.

An internal cover according to embodiments of the present invention is an internal cover that covers a unit inside an image forming apparatus.

The internal cover includes: a cover portion openable and closable by rotation on a rotation shaft; a hinge portion that forms the rotation shaft of the cover portion, where the rotation shaft is inclined with respect to the vertical direction of the image forming apparatus to allow the cover portion to be opened diagonally upward; and a hand-cranked fixing screw that maintains the cover portion in a closed state.

The cover portion is opened diagonally upward as the hand-cranked fixing screw is released, and the cover portion is fixable in an opened state at a predetermined position.

An image forming apparatus according to embodiments of the present invention includes an external cover and an internal cover provided inside the external cover, and the internal cover is the above-described internal cover according to embodiments of the present invention.

FIG. 1 is a schematic diagram of an overall configuration of an image forming apparatus according to embodiments of the present invention. In FIG. 1, an external cover is omitted.

This image forming apparatus includes a document reading portion that functions as a scanner. The image forming apparatus of the present embodiment is not limited to such a configuration and does not necessarily include the document reading portion. For example, the image forming apparatus of the present embodiment may be an online output-only machine for a personal computer, or may include a built-in controller as a printer version or the like. For example, the image forming apparatus of the present embodiment may be a copying machine that forms a monochrome image, or may function as a printer by connecting to a personal computer.

An operation example of the image forming apparatus of the present embodiment is described with an overview of an apparatus configuration.

First, an operator sets a document including an image desired to be copied into the document reading portion. Examples of the document reading portion include a scanner unit 104 and an ADF unit 103. The document is set on a contact glass placed above the scanner unit 104 or in the ADF unit 103.

Next, the operator operates an operation panel unit 101 to set desired image forming conditions. For example, without being particularly limited to this, the operator selects a copy mode using a function selection key and sets the conditions while checking contents displayed on a liquid crystal screen.

An image signal read by the document reading portion is subjected to analog to digital (A/D) conversion, for example, by a sensor board unit (SBU), and then a resulting laser beam is emitted inside the apparatus. The laser beam is focused by a cylinder lens and line-scanned in the main scanning direction by a polygon mirror. The light that has passed through the cylinder lens and the polygon mirror is emitted from a laser writing unit 112 to a photoconductor drum 116 to form an electrostatic latent image on the photoconductor drum 116.

Next, an electrostatic charger 115 charges the photoconductor drum 116. For example, a power supply unit (PSU) applies a high voltage to the electrostatic charger 115 through a receptacle, an electrode terminal, a conductive bearing, and the like.

Next, a developing unit 113 applies toner to the photoconductor drum 116 to develop the electrostatic latent image on the photoconductor drum 116. As a result, a toner image (also referred to as a visible image, a developed image, etc.) is formed on the photoconductor drum 116. The developing unit 113 applies the toner to the photoconductor drum 116 using, for example, a developing roller. An additional description is given below regarding the toner application to the photoconductor drum 116.

The toner is supplied as needed to the developing unit 113 from, for example, a toner supply unit 111. For example, a toner bottle can be used as the toner supply unit 111. In the developing unit 113, the toner supplied from the toner supply unit 111 and a developer previously filled in the developing unit 113 are stirred and mixed while being transported to the developing roller. The stirring and mixing of the toner and the developer are performed by, for example, a conveying screw in the developing unit 113.

The toner that is electrostatically attracted to the developing roller by magnetic force is negatively charged. The two-component developer carried on the developing roller is regulated to a proper amount on the developing roller. The regulation is performed by, for example, a developer rising regulator or the like, such as a doctor blade or casing, placed below the developing roller.

After the two-component developer carried on the developing roller is regulated, the triboelectrically charged toner in the two components is moved to the photoconductor drum 116 by a bias voltage and selectively adhered to the photoconductor drum 116 according to the electrostatic latent image on the photoconductor drum 116. The toner concentration inside the developing unit 113 is detected, for example, based on the amount of charge of the toner inside the unit determined by a toner concentration sensor provided on the bottom of the unit.

An inlet seal formed of, for example, MYLAR or sponge is appropriately provided around the developing unit 113. The inlet seal can prevent toner scattering.

Next, the toner image formed on the photoconductor drum 116 is once transferred to an intermediate transfer belt unit 105. The intermediate transfer belt unit 105 includes an intermediate transfer belt, and the toner image is transferred to the intermediate transfer belt.

Untransferred toner remaining on the photoconductor drum 116 after the transfer is collected by a photoconductor cleaning unit 114. The photoconductor cleaning unit 114 scrapes off the toner on the photoconductor drum 116 using, for example, a cleaning blade.

The scraped off toner is transported and collected into a waste toner bottle 125.

Next, a recording medium that has passed through a registration roller portion passes between a nip of the intermediate transfer belt unit 105 and a secondary transfer unit 118. When the recording medium passes through the nip, the toner transferred to the intermediate transfer belt unit 105 is transferred to the recording medium due to positive charging from a secondary transfer roller in the secondary transfer unit 118.

A voltage is applied to the transfer roller, for example, from a power supply unit (PSU) through a receptacle, an electrode terminal, a bearing, and the like.

Constant current control is performed in the secondary transfer unit 118 to prevent fluctuations due to the environment, a type of paper sheets, and the like. Further, the transfer current can be changed as appropriate depending on a paper sheet feed tray, a transfer paper sheet size, a paper sheet thickness, and the like.

A negative bias is applied to the transfer roller at a predetermined timing in order to clean the transfer roller. When the negative bias is applied to the transfer roller, the toner attached to the transfer roller can be returned to the intermediate transfer belt unit 105. This makes it possible to prevent staining of the back side of the transfer paper sheet due to the toner adhering to the transfer roller.

Untransferred toner remaining on the intermediate transfer belt unit 105 after the transfer is collected by an intermediate transfer belt cleaning unit 106. The intermediate transfer belt cleaning unit 106 scrapes off the toner on the intermediate transfer belt using, for example, a cleaning blade. The scraped off toner is transported and collected into the waste toner bottle 125.

Next, a fixing unit 107 fixes the toner transferred to the recording medium. The fixing unit 107 applies constant temperature and pressure to the conveyed recording medium to thermally fuse the toner to the recording medium. The fixing unit 107 includes, for example, a fixing roller, a fixing belt wrapped around the fixing roller, a pressure roller facing the fixing roller, a heater that heats the fixing belt, and the like.

The fixing unit 107 detects a surface temperature of the fixing roller using, for example, a thermistor, and controls ON/OFF of the heater based on the surface temperature. The thermistor may or may not be in contact with the fixing roller. The fixing unit 107 may include a thermal fuse or the like to prevent the temperature from becoming too high.

For example, the fixing unit 107 forms a fixing nip with the pressure roller and the fixing belt. The toner is fixed when the recording medium passes through the fixing nip. For example, pressurization and depressurization of the pressure roller is controlled by a cam.

Next, the recording medium that has passed through the fixing nip is separated from the pressure roller and the fixing belt by a fixing separation plate, and is conveyed to a reversing sheet discharge unit 109. The reversing sheet discharge unit 109 performs conveyance for double-sided printing according to setting conditions. The recording medium that has passed through the reversing sheet discharge unit 109 is ejected to a sheet ejection tray 126. A series of these operations completes the process of the image formation using the electrophotographic method.

In the above example, the recording medium is ejected to the sheet ejection tray 126. However, the present embodiment is not limited thereto. After passing through the reversing sheet discharge unit 109, the recording medium may be conveyed to another apparatus. Examples of other apparatuses include a post-processing apparatus. The post-processing apparatus performs, for example, folding processing, stapling processing, or the like.

The image forming apparatus illustrated in FIG. 1 further includes a call light 100, a fixing conveying unit 108, a inverted double-sided sheet storage unit 110, a sheet conveying unit 117, a vertical conveying unit 119, a first sheet feeding unit 120, a second sheet feeding unit 121, a third sheet feeding unit 122, universal trays 123 (in two stages), a tandem tray 124, and mobile casters 127.

Next, a detailed example of the internal cover according to an embodiment of the present invention is described.

In the following descriptions, unit maintenance work is described as unit replacement work as an example. However, the unit maintenance work is not limited to the unit replacement work. The unit maintenance includes not only the unit replacement but also unit inspection, repair, modification, and the like. Further, the unit replacement refers to, for example, replacing an old unit or a unit with a defect with a new unit or a unit free from a defect.

According to the present embodiment, it is possible to provide an internal cover for an image forming apparatus that allows easy access to the unit to be maintained, facilitates the maintenance work such as the unit replacement, and hardly obstructs replacement of other units. The internal cover may be referred to as an inner cover or the like.

Figure 2:
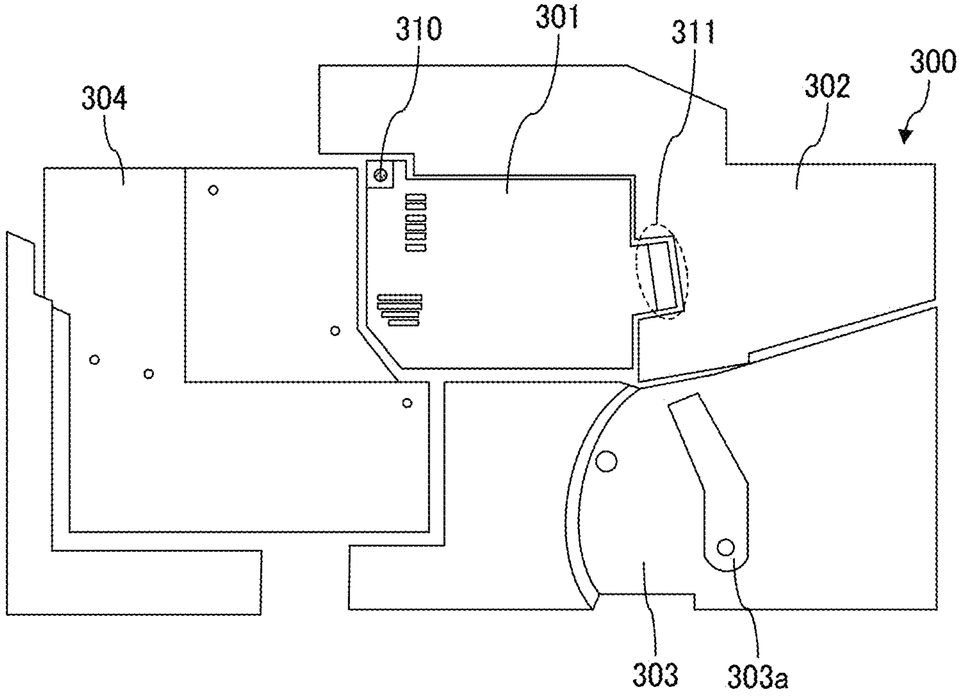
FIG. 2 is a schematic diagram of an internal cover in a closed state.
Figure 3:
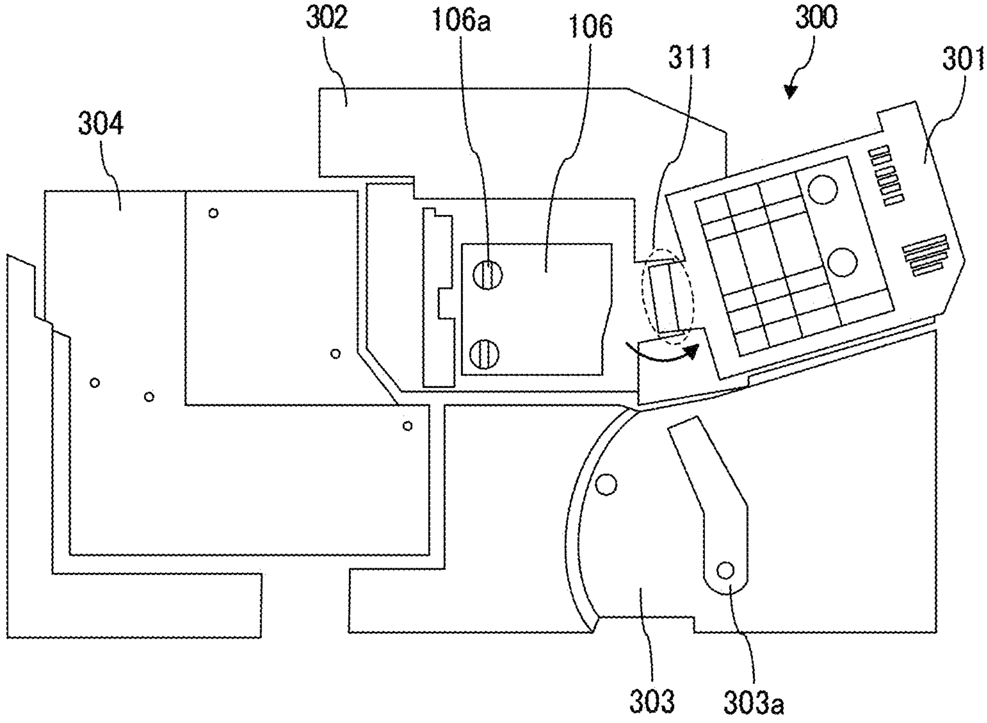
FIG. 3 is a schematic diagram of an internal cover in an opened state.

FIG. 2 is a schematic diagram illustrating a state in which an external cover of the image forming apparatus is opened, specifically, a state in which a cover portion 301 of an internal cover 300 is closed. FIG. 3 is a schematic diagram illustrating a state in which the cover portion 301 in FIG. 2 is opened.

The internal cover 300 of this example includes an image forming unit internal cover 302, the cover portion 301, a fixing screw 310 (may also be referred to as hand-cranked fixing screw 310), and a hinge portion 311. For example, an image forming unit and the intermediate transfer belt cleaning unit 106 are provided inside the internal cover 300. The image forming unit internal cover 302 and a fixing unit internal cover 304 are fixed by screws.

As illustrated in FIG. 2, the internal cover 300 of the present embodiment includes the cover portion 301 that is rotatable to be opened and closed, the hand-cranked fixing screw 310 that keeps the cover portion 301 in a closed state, and the hinge portion 311 that forms a rotation shaft of the cover portion 301.

The rotation and opening of the cover portion 301 are schematically illustrated by an arrow in FIG. 3. Further, the rotation shaft of the cover portion 301 is inclined with respect to the vertical direction, so that the cover portion 301 is opened diagonally upward. As illustrated in FIG. 3, the cover portion 301 is opened diagonally upward.

Opening the cover portion 301 diagonally upward makes it possible to avoid interfering with replacement work of the intermediate transfer unit. The opened cover portion 301 does not obstruct opening and closing of an intermediate transfer belt unit internal cover 303, and thus does not obstruct work of replacing the intermediate transfer belt unit 105. This makes the internal cover 300 hardly obstructive for replacement of other units.

In the present embodiment, other units to be maintained (the intermediate transfer belt unit 105 in this example) are provided in the apparatus below the internal cover 300 in the vertical direction. Since the cover portion 301 is opened diagonally upward, the opened cover portion 301 does not obstruct the movement of the above-mentioned other units to be maintained while the other units are pulled out toward the front of the apparatus. This makes the internal cover 300 hardly obstructive for replacement of other units, thereby improving the efficiency of the maintenance work.

For example, in the state illustrated in FIG. 3, even if the cover portion 301 is opened, the entire intermediate transfer belt unit 105 to which the intermediate transfer belt unit internal cover 303 is attached can be moved as it is on a slide rail toward the front direction. Opening the cover portion 301 diagonally upward makes it possible to prevent the intermediate transfer belt unit 105 from being damaged by interference. Note that the intermediate transfer belt unit 105 can be pulled out toward the front direction by tilting a lever 303*a*.

In conventional technologies, internal covers for the image forming unit and the intermediate transfer belt cleaning unit 106 are formed into an integrated structure. Thus, replacing the intermediate transfer belt cleaning unit 106 requires removing the integrated internal cover, causing considerable efforts to replace the unit. On the other hand, in the present embodiment, opening the cover portion 301 allows the operator to access a unit to be maintained and replace the unit, thereby improving the efficiency of the maintenance work.

In the present embodiment, the cover portion 301 is maintained in a closed state by the hand-cranked fixing screw 310. Thus, the cover portion 301 can be opened simply by turning the hand-cranked fixing screw 310 by hand without using a tool such as a screwdriver. Thus, the unit to be maintained can be easily accessed, making it easier to perform the maintenance work such as the unit replacement. Further, closing the cover portion 301 does not require a tool such as a screwdriver, reducing the effort and time required for the maintenance work. Further, even a user who is not familiar with the apparatus can easily perform the replacement work of the unit. The hand-cranked fixing screw 310 is not particularly limited, and for example, a commercially available product can be used.

The timing of maintenance is not particularly limited, and the maintenance may be performed periodically or irregularly. Examples of the irregular maintenance include maintenance performed when a problem occurs. Further, the cover portion 301 may be opened not only when the unit is replaced, but also when the unit is inspected, repaired, or modified.

In the state illustrated in FIG. 3, the intermediate transfer belt cleaning unit 106 can be replaced. A method of replacing the unit is not particularly limited, and examples of the method include a method of pulling out the unit. For example, the intermediate transfer belt cleaning unit 106 is pulled out by pulling a handle 106*a* for replacement. As illustrated in FIG. 3, when replacing the intermediate transfer belt cleaning unit 106, it is sufficient to simply open the cover portion 301, and the image forming unit internal cover 302 may remain closed. In the present embodiment, as illustrated in FIG. 3, the cover portion 301 is preferably closed by one fixing screw 310 provided on the opposite side of the hinge portion 311 with respect to the vertical direction in the cover portion 301. In this manner, it is possible to fix the cover portion 301 with one hand-cranked fixing screw 310 and open the cover portion 301 just by releasing one fixing screw 310, thereby reducing the labor for the work.

In the present embodiment, the cover portion 301 is opened diagonally upward by releasing the fixing screw 310, and after being opened, the cover portion 301 is fixed at a predetermined position. FIG. 3 illustrates a state in which the cover portion 301 is fixed at the predetermined position. Fixing the cover portion 301 in an opened state in this manner facilitates the maintenance work such as the unit replacement. For example, when performing the maintenance such as the unit replacement, there is no need to hold the cover portion 301 by hand, and the cover portion 301 does not hit the operator or the unit being replaced.

Note that "fixed at a predetermined position" means that the cover portion 301 stays at that position without the operator (a user, etc.) applying force to the cover portion 301. In the present embodiment, when the operator applies force to the cover portion 301 fixed at the predetermined position, the fixed state of the cover portion 301 is released, making it possible to change the position of the cover portion 301. That is, after the cover portion 301 is fixed at the predetermined position in the opened state, the operator can close the cover portion 301 by hand. For this reason, the term "fixed" described herein may also be referred to as "temporarily fixed".

After the cover portion 301 is opened, a method of fixing the cover portion 301 at the predetermined position can be selected as appropriate. For example, it is preferable that the hinge portion 311 includes a convex portion and a concave portion, and the cover portion 301 is fixed at the predetermined position by the convex portion and the concave portion being fitted together. In this case, the cover portion 301 can be fixed at the predetermined position with a simple configuration.

An example of such a convex/concave shape is described with reference to FIG. 4 to FIG. 6.

Figure 4:
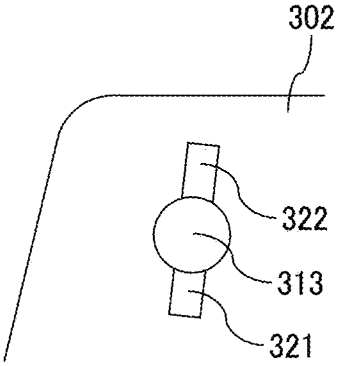
FIG. 4 is a schematic diagram of a hinge portion.

FIG. 4 is a schematic plan view of the area around the rotation shaft of the cover portion 301 in the image forming unit internal cover 302, viewed from the above. FIG. 5 is a schematic plan view of the area around the rotation shaft of the cover portion 301 in the cover portion 301, viewed from the below. FIGS. 6A to 6C are schematic plan views for explaining movement of a convex portion 320. FIG. 6A illustrates a state in which the cover portion 301 is closed (as in FIG. 2), FIG. 6B illustrates a state in which the cover portion 301 is being opened or closed, and FIG. 6C illustrates a state in which the cover portion 301 is opened (as in FIG. 3).

Note that the hinge portion 311 in this example is a portion that includes a part of the cover portion 301 and a part of the image forming unit internal cover 302. The part of the image forming unit internal cover 302 included in the hinge portion 311 is a part that faces the cover portion 301 and includes a first concave portion 321 and a second concave portion 322.

As illustrated in FIG. 4, the image forming unit internal cover 302 includes the first concave portion 321 and the second concave portion 322 around a rotation shaft 313. The first concave portion 321 and the second concave portion 322 are provided at positions facing the cover portion 301.

Figure 5:
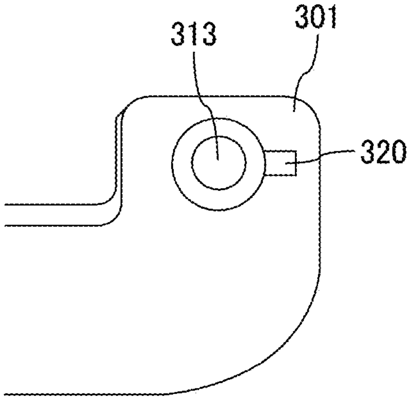
FIG. 5 is a schematic diagram of a hinge portion.
Figure 6A:
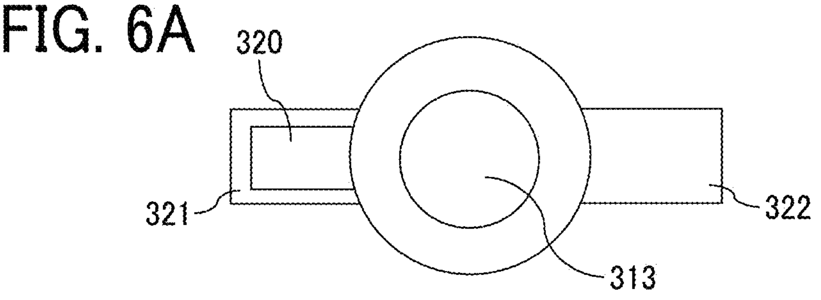
FIGS. 6A to 6C are schematic diagrams for explaining movement of a hinge portion, where
Figure 6B:
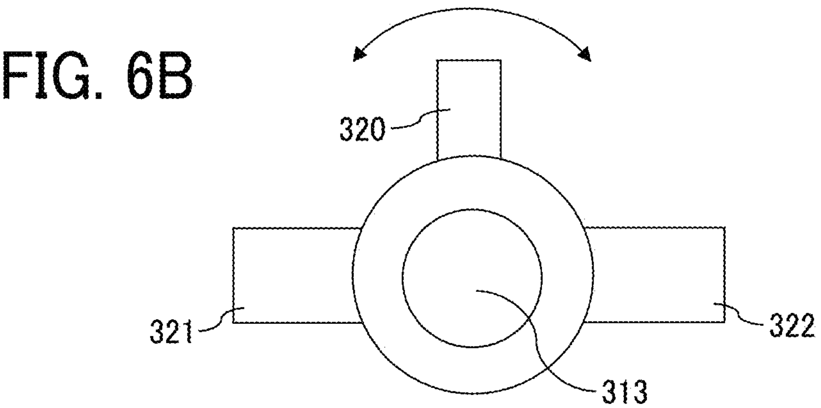
Figure 6C:
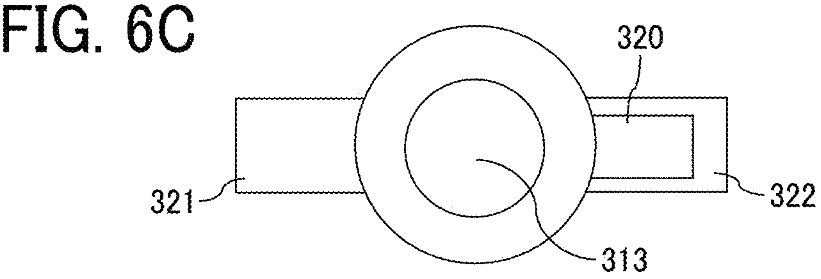

As illustrated in FIG. 5, the cover portion 301 includes the convex portion 320 around the rotation shaft 313. The convex portion 320 is projected to the lower side. The lower side means diagonally downward in the vertical direction. The convex portion 320 moves in conjunction with the movement of the cover portion 301.

As illustrated in FIG. 6A, the convex portion 320 fits into the first concave portion 321 when the cover portion 301 is in the closed state. When the cover portion 301 is opened, the convex portion 320 rotates in the direction of the second concave portion 322 in conjunction with the cover portion 301, as illustrated in FIG. 6B. When the cover portion 301 reaches the predetermined position, the convex portion 320 fits into the second concave portion 322, as illustrated in FIG. 6C. When the cover portion 301 is opened and reaches the predetermined position, the convex portion 320 and the second concave portion 322 are fitted together, and the cover portion 301 is fixed in the opened state. For example, with such a configuration, the cover portion 301 can be fixed at the predetermined position in the opened state. When closing the cover portion 301, the transition between the states occurs in the order of FIG. 6C, FIG. 6B, and FIG. 6A.

The above-mentioned fitting state can be released. Further, the convex portion 320 is subjected to force acting vertically downward or vertically diagonally downward due to the weight of the cover portion 301. Due to this force, the convex portion 320 fits into a concave part of the first concave portion 321 and a concave part of the second concave portion 322.

As the hinge portion 311 includes the convex portion and the concave portion, it is preferable that there exist spaces above and below the rotation shaft 313 so that the cover portion 301 is displaceable along the rotation shaft 313 making use of the spaces. Since the cover portion 301 in the opened state is fixed only due to the convex and concave shapes, the cover portion 301 being displaceable along the rotation shaft 313 making use of the spaces is able to follow and overcome the convex and concave shapes.

Aspects of the present invention are, for example, as follows.

According to a first aspect, an internal cover that covers a unit inside an image forming apparatus includes: a cover portion openable and closable by rotation on a rotation shaft; a hinge portion that forms a rotation shaft of the cover portion, where the rotation shaft is inclined with respect to a vertical direction of the image forming apparatus to allow the cover portion to be opened diagonally upward; and a hand-cranked fixing screw that maintains the cover portion in a closed state, in which the cover portion is opened diagonally upward as the hand-cranked fixing screw is released, and the cover portion is fixable in an opened state at a predetermined position.

According to a second aspect, in the internal cover in the first aspect, the cover portion in the opened state does not obstruct movement of another unit disposed below the internal cover in the image forming apparatus when said another unit is pulled out toward front of the image forming apparatus.

According to a third aspect, in the internal cover in the first or second aspect, the hand-cranked fixing screw is disposed on an opposite side of the hinge portion with respect to the vertical direction in the cover portion.

According to a fourth aspect, in the internal cover in any of the first to third aspects, the hinge portion includes a convex portion and a concave portion being fittable together to fix the cover portion in the opened state at the predetermined position.

According to a fifth aspect, in the internal cover in the fourth aspect, the cover portion is displaceable along the rotation shaft making use of spaces above and below the rotation shaft.

According to a sixth aspect, an image forming apparatus includes an external cover the internal cover in any of the first to fifth aspects.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. An internal cover that covers a unit inside an image forming apparatus, the internal cover comprising:

a cover portion openable and closable by rotation on a rotation shaft;

a hinge portion that forms the rotation shaft of the cover portion, the rotation shaft inclined with respect to a vertical direction of the image forming apparatus to allow the cover portion to be opened diagonally upward; and a hand-cranked fixing screw that maintains the cover portion in a closed state, wherein the cover portion is opened diagonally upward as the hand-cranked fixing screw is released, and the cover portion is fixable in an opened state at a predetermined position.

2. The internal cover according to claim 1, wherein the cover portion in the opened state does not obstruct movement of another unit disposed below the internal cover in the image forming apparatus when said another unit is pulled out toward front of the image forming apparatus.

3. The internal cover according to claim 1, wherein the hand-cranked fixing screw is disposed on an opposite side of the hinge portion with respect to the vertical direction in the cover portion.

4. The internal cover according to claim 1, wherein the hinge portion includes a convex portion and a concave portion being fittable together to fix the cover portion in the opened state at the predetermined position.

5. The internal cover according to claim 4, wherein the cover portion is displaceable along the rotation shaft making use of spaces above and below the rotation shaft.

6. An image forming apparatus comprising:

an external cover; and the internal cover according to claim 1 disposed inside the external cover.

* * * * *